(12) United States Patent
Henriksson

(10) Patent No.: US 8,936,250 B2
(45) Date of Patent: Jan. 20, 2015

(54) TELESCOPING CYLINDER DEVICE AND VEHICLE

(75) Inventor: Arne Henriksson, Skummesloevsstrand (SE)

(73) Assignee: Multi Modal Development Sweden AB, Skummeslovsstrand (SE)

( * ) Notice: Subject to any disclaimer, the term of this patent is extended or adjusted under 35 U.S.C. 154(b) by 0 days.

(21) Appl. No.: 13/818,800

(22) PCT Filed: Aug. 24, 2011

(86) PCT No.: PCT/SE2011/051020
§ 371 (c)(1),
(2), (4) Date: Mar. 20, 2013

(87) PCT Pub. No.: WO2012/030281
PCT Pub. Date: Mar. 8, 2012

(65) Prior Publication Data
US 2013/0181415 A1   Jul. 18, 2013

(30) Foreign Application Priority Data

Sep. 2, 2010   (SE) ..................................... 1050900

(51) Int. Cl.
| | |
|---|---|
| *B60G 17/00* | (2006.01) |
| *B60P 1/00* | (2006.01) |
| *B60S 9/00* | (2006.01) |
| *F16J 10/02* | (2006.01) |
| *F15B 15/16* | (2006.01) |
| *B62D 9/00* | (2006.01) |
| *B60G 3/01* | (2006.01) |

(52) U.S. Cl.
CPC ................. *F16J 10/02* (2013.01); *F15B 15/16* (2013.01); *B60G 17/00* (2013.01); *B62D 9/00* (2013.01); *B60G 3/01* (2013.01)
USPC ...................................... 280/6.157

(58) Field of Classification Search
CPC .......... F15B 15/16; B60G 17/00; B60G 3/01; B62D 9/00; F16J 10/02
USPC ........... 280/6.157; 92/51, 52, 53, 61, 62, 107, 92/108; 91/167 R, 168, 170 R, 173
See application file for complete search history.

(56) References Cited

U.S. PATENT DOCUMENTS

| | | |
|---|---|---|
| 3,207,044 A | 9/1965 | Hall |
| 3,236,324 A | 2/1966 | Levratto |
| 3,696,712 A | 10/1972 | Sung |
| 3,920,084 A | 11/1975 | Russell, Jr. |
| 5,684,698 A | 11/1997 | Fujii et al. |

FOREIGN PATENT DOCUMENTS

| | | | |
|---|---|---|---|
| DE | 102006061770 A1 * | 7/2008 | ............... B60K 1/00 |
| FR | 2609262 A1 | 7/1988 | |

OTHER PUBLICATIONS

International Search Report PCT/ISA/210 for PCT/SE2011/051020 dated Dec. 30, 2011.

* cited by examiner

*Primary Examiner* — Paul N Dickson
*Assistant Examiner* — Joselynn Y Sliteris
(74) *Attorney, Agent, or Firm* — Harness, Dickey & Pierce, P.L.C.

(57) ABSTRACT

A telescoping cylinder device including double-walled cylinders is disclosed. By way of a pressure medium, the cylinders are displaceable relative to each other by moving inside the space formed between the two walls. A central through hole extends axially through the cylinders and provide a passage for transmission. A vehicle including a plurality of telescoping cylinder devices is also disclosed.

10 Claims, 9 Drawing Sheets

TELESCOPING CYLINDER DEVICE AND VEHICLE

TECHNICAL FIELD

The present invention relates to a telescoping cylinder device, comprising a first cylinder and a second cylinder which is axially displaceable relative to the first cylinder in response to a pressure exerted by a pressure medium. The present invention also relates to a vehicle, comprising a chassis, a plurality of wheels and a plurality of telescoping cylinder devices operatively connected to the wheels.

BACKGROUND OF THE INVENTION

Telescoping cylinder devices which are operated by a pressure medium have been used in different industrial applications, for instance in cranes and lifting trucks. The function of the telescoping cylinder device is to move an object linearly, e.g. move a crane, lift the fork of a fork truck, etc. For any other operation or movement of the object, a separate device or mechanism is required, which contributes to the bulkiness of the overall construction.

It would be desirable to reduce the need for such separate devices or mechanisms and instead provide a telescoping cylinder device which has multiple functions.

SUMMARY OF THE INVENTION

The present invention is based on the insight that by making a pressure medium operated telescoping cylinder device hollow, a passage may be provided for transmission means. Such transmission means may e.g. provide a different motion than the linear motion of the telescoping parts of the cylinder. Alternatively, the transmission means may provide a transmission of electronic signals or the transmission of a fluid etc. Since at least a part of the transmission means is provided in a passage inside the telescoping cylinder device, it is protected from inadvertent damaging. Also, being provided inside the telescoping cylinder device, it adds little, if any bulkiness to the structure.

According to a first aspect of the invention, a telescoping cylinder device is provided. It comprises a first cylinder having a cylindrical inner wall, a cylindrical outer wall and a space between said inner and outer walls; a second cylinder having a cylindrical wall which is axially displaceable in said space in response to a pressure exerted by a pressure medium; and a central through hole extending axially through said first and second cylinders and providing a passage for transmission means.

By providing the first cylinder in the form of a double-walled cylinder defining a space in which a pressure medium may be provided, the second cylindrical wall of the second cylinder may be displaced by the pressure medium in said space. Thus, there is no need for a piston at the central axis of the first cylinder. Rather, the traditional function of the piston can been placed in a peripheral portion of the cylinder device, i.e. in the space in the circumferential cylindrical double-wall. Hence, the centre of the first and second cylinders may be open and form a passage from one end of the device to the other.

The pressure medium is suitably a fluid pressure medium. It may be a hydraulic medium in the form of a liquid (e.g. oil), or it may be a pneumatic medium in the form of a gas (e.g. air).

The stroke of the piston may be controlled by controlling the amount of pressure medium provided into the space. Thus, if a full stroke is not required, less pressure medium is provided proximally to the second cylinder, than what would be applied for a full stroke. Thus, the double-walled cylinder allows for pressure medium controlled length of stroke and with the additional benefit of allowing for transmission/communication through the centre of the cylinder device.

The telescoping cylinder device may comprise additional cylinders, e.g. for attaining a longer linear movement and/or for providing different functionalities in connection with different cylinders. For instance, if a third cylinder is present, then the cylindrical wall of the second cylinder would also be a double-wall.

Thus, according to at least one example embodiment, the cylindrical wall of said second cylinder comprises a cylindrical inner wall, a cylindrical outer wall and a space between said inner and outer walls. The device further comprises a third cylinder having a cylindrical wall which, in response to a pressure medium, is axially displaceable in said space between the inner and outer walls of said second cylinder, wherein said central through hole extends axially through the third cylinder.

Of course, a fourth cylinder, a fifth cylinder, etc. could also be provided in a similar manner using the above described double-walled structure. When used for controlling the wheels of a vehicle, the different cylinders may be provided with different functionalities. For instance, the space in which one of the second and third cylinders is displaceable may be operatively connected to a suspension and/or shock absorbing arrangement, such as a hydraulic shock absorber conduit, e.g. having an appropriate gas accumulator and valve. Thus, a cylinder acting as a shock absorber will generally not be fully advanced or retracted to allow for spring action of the cylinder. Rather, the other cylinder or cylinders may be fully advanced or retracted to lower or raise the vehicle wheels.

In the case of the telescoping cylinder device having three or more cylinders, it may be advantageous to enable the cylinders to be separately actuatable. For, it may be only partly advance the second cylinder relative to the first cylinder, while the third cylinder is fully advanced relative to the second cylinder. This is reflected in at least one example embodiment, wherein the second cylinder and third cylinder are individually advanceable by means of pressure medium provided in separate pressure lines connected to the respective cylinders, and/or individually retractable by means of pressure medium provided in separate return lines connected to the respective cylinders.

The central passage (through hole) provided through the cylinders of the telescoping cylinder device may contain a rotatable element. The rotational movement of the element inside the cylinders may be operatively coupled to an object located outside the cylinder, in order to rotate said object. The object may, for instance, be a claw of a crane, a vehicle wheel, a working tool, etc.

The rotational control of an object outside the cylinders is reflected in at least one example embodiment of the invention, according to which the transmission means comprises a rotatable shaft extending axially in said through hole for transmitting a rotating motion to an object operatively connected to the rotatable shaft. The term "operatively connected" means that the object can be directly connected to the shaft or indirectly, e.g. via one or more connecting elements or links. The rotatable shaft may extend out from the through hole. Alternatively, the rotatable shaft extends out from the through hole in a condensed state of the cylinders and is hidden in the through hole in an extended state of the cylinders. A further alternative, is to have the rotatable shaft hidden inside the cylinders even in their condensed state. A connecting element may then extend or be operated to extend out from the cylinders for providing a connection to an object outside of the cylinders. Alternatively, the shaft may be operatively connected to the most distal cylinder in order to transmit a rotating motion to said cylinder, which in turn may be connected to the outside object.

According to at least one example embodiment, the rotatable shaft is provided with circumferentially spaced cogs or teeth cooperable with mating cogs or teeth of a driving unit adapted to rotate the shaft. The driving unit may, for instance, form part of or be connected to a tie rod, steering wheel, operating handle, etc.

According to at least one example embodiment, said cogs are shaped as elongate beams extending axially along the shaft. The beams may suitably extend substantially all the way to the distal end of the shaft. The beams may suitably be evenly spaced around the shaft. Alternatively, one or more beams may be omitted to provide a passage for other equipment, such as a length gauge for measuring cylinder strokes or an altimeter, or any other suitable devices.

According to at least one example embodiment, said shaft is hollow and provides a passage for additional transmission means. For instance, the transmission means may comprise tubing for transmitting fluid, such as oil, or wires for transmitting electrical signals, or a mechanical arrangement for transmitting a motion, etc. Of course, such tubing and wires may also be provided if the shaft is not hollow, e.g. along the outside of the shaft.

According to at least one example embodiment, the telescoping cylinder device comprises a slider which is adapted to slide axially on the shaft, wherein the slider is operatively connected to said object to transmit the rotational motion of the shaft to said object. Thus, the slider may be provided with recesses, which mate with the cogs/beams of the shaft, thereby following and transmitting the rotational motion. Suitably, the slider encircles the shaft and is thus provided with recesses on an inner wall of the slider. The slider is suitably provided with elongate recesses, which may have a corresponding extension as the elongate beams of the shaft. However, this is not necessary, shorter recesses may be provided as long as the shaft can transmit the rotating motion to the slider and the slider can slide up and down the shaft.

According to at least one example embodiment, said slider is operatively connected to the last (most distal) cylinder of the cylinder device, wherein, when the last cylinder of the cylinder device is displaced an axial distance relative to said first cylinder, said slider is adapted to travel the corresponding distance along the shaft. In other words as the last cylinder is displaced relative to the other cylinder/cylinders, it will pull/push the slider in the corresponding direction. It should be understood that the "last" cylinder corresponds to the second cylinder if only two cylinders are provided, to the third cylinder if only three cylinders are provided, etc.

From the above, it is appreciated that the slider may slide along the beams of the shaft. However, other alternatives are also be conceivable. For instance, the slider may comprise a roller bearing with roller elements. Such roller elements could roll in tracks provided on the rotatable shaft. Thus, according to at least one example embodiment, the rotatable shaft is provided with a plurality of circumferentially spaced axially extending tracks adapted to receive roller elements of a roller bearing.

It should be understood that the shaft may comprise both cogs and tracks for roller bearings. For instance, cogs may be provided to cooperate with corresponding cogs of a driving unit, while the tracks may be used to cooperate with the roller elements of the slider.

According to at least one example embodiment, said object is a vehicle wheel operatively connected to the last cylinder of the cylinder device. Thus, the axial movement of the last cylinder will affect the axial movement of the wheel. This may be used, for instance for elevating a chassis of the vehicle, e.g. when passing a hurdle, or for lifting one side of the chassis to compensate for a lateral slope on which the vehicle is travelling. As has already been mentioned, there are other conceivable applications as well. For instance, the object may be a tool which can be moved axially by the cylinders.

For avoiding environmental pollution, the telescoping cylinder device is suitably sealed towards the outside of the device. However, on the inside, i.e. between facing inner walls of two mating cylinders, there may be allowed a certain leakage providing a lubricating effect so as to reduce the friction between the cylinders. The leakage is suitably collected and recycled to an oil reservoir.

According to at least one example embodiment, the telescoping cylinder device comprises a leakage collector provided at a distal end portion of the last cylinder, wherein the leakage collector is positioned to receive leakage from an area located between the inner wall of one of the cylinders and a facing inner wall of another one of the cylinders. Thus, the leakage may come from an area between the first and the second cylinder. If a third cylinder is present, the leakage may come from an area between the second and the third cylinder. The leakage area is thus located between the outside of one of the inner walls and the inside of the other one of the inner walls.

According to a second aspect of the invention, a vehicle is provided. The vehicle comprises a chassis and a plurality of telescoping cylinder devices, wherein each telescoping cylinder device is operatively connected to a respective wheel, wherein the vertical distance between each wheel and the chassis is dependent on the length of expansion of the respective telescoping cylinder device, and wherein each telescoping cylinder device has an axial through hole forming a passage for an axially extending rotatable shaft, wherein the shaft is operatively connected to the wheel for transmitting a rotating motion to the wheel.

According to at least one example embodiment, the vehicle comprises a controller which is adapted to individually expand or condense the telescoping cylinder device, and which is adapted to individually rotate the respective shaft. In other words, each wheel may be individually controlled with regard to its vertical distance to the chassis and its rotational position. For instance, for climbing a hurdle, all of the telescoping cylinder devices may be expanded thereby raising the chassis. Next, the front wheels may be raised by condensing the respective telescoping cylinder devices. The wheel can move forward and lower the front wheels when they have passed the hurdle. The corresponding operation can then be made with the remaining trailing wheels.

Often a hurdle may be approached by a vehicle at an angle. According to at least one example embodiment of the invention, the vehicle controller, e.g. a computer, may determine in which order to raise and lower the different wheels depending on i.a. the angle at which a hurdle is approached. For instance, if a straight fence is approached by the vehicle at about 45°, the controller may determine the following raising order: first raise the front wheel closest to the hurdle, then the other front wheel simultaneously with an intermediate wheel closest to the hurdle, then the other intermediate wheel simultaneously with the rear wheel closest to the hurdle and finally the other rear wheel. As the vehicle moves forward, the wheels that have passed the hurdle are successively lowered. Thus, the number of wheels will be raised in a 1-2-2-1 sequence. Depending on the angle, an alternative would be an alternating 1-1-1-1-1-1 sequence, i.e. the raising order will be: the closest front wheel, the other front wheel, the closest intermediate wheel, the other intermediate wheel, the closest rear wheel, and finally the other rear wheel.

According to at least one example embodiment, the vehicle has a pair of front shafts connected to front wheels, a pair of rear shafts connected to rear wheels, and optionally one or more pairs of intermediate shafts connected to intermediate wheels, wherein the vehicle comprises a controller adapted to rotate said shafts in pairs. The shafts may, for instance, be connected via a tie rod arrangement, wherein the controller e.g. including a steering wheel operates on the tie rod arrangement.

The telescoping cylinder devices of the vehicle according to the second aspect of the invention may have any one of the features of the telescoping cylinder device according to the first aspect of the invention.

DETAILED DESCRIPTION OF THE DRAWINGS

Figure 1:
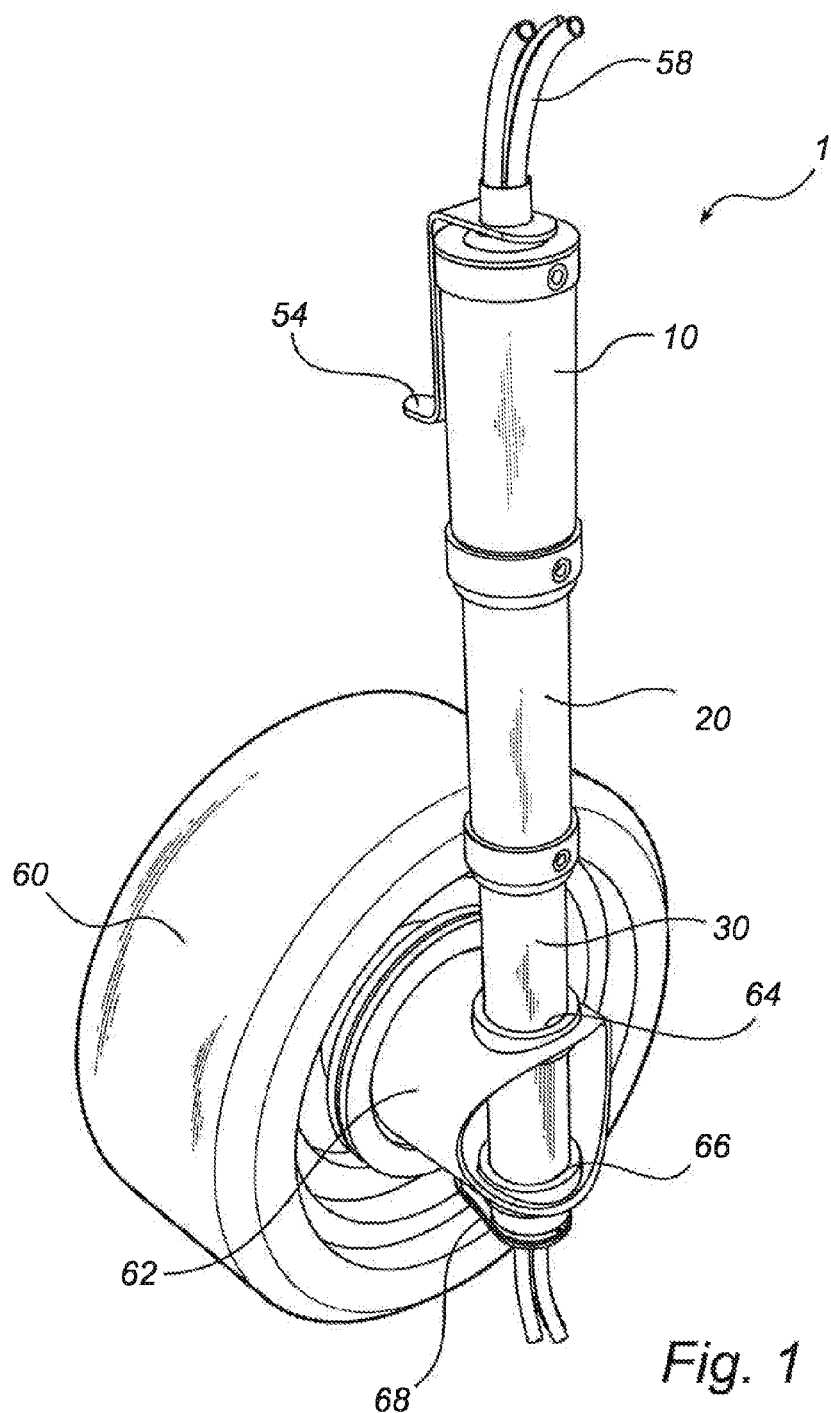
FIG. 1 illustrates a telescoping cylinder device according to at least one example embodiment of the invention.

FIG. 1 illustrates a telescoping cylinder device 1 according to at least one example embodiment of the invention. The telescoping cylinder device 1 comprises a first cylinder 10, a second cylinder 20 and a third cylinder 30. The first cylinder 10 may be fixed to a structure, such as a vehicle chassis. The second cylinder 20 may be retracted into the first cylinder 10. Similarly, the third cylinder 30 may be retracted into the second cylinder 20. All the cylinders are hollow (see e.g. FIGS. 3a-3c), thus providing a central through hole 40 (see FIG. 3b) in which a rotatable shaft 50 is provided for transmitting a rotational motion to a wheel 60.

More specifically, the wheel 60 is carried by a wheel axle 62, which is arranged on the third cylinder 30. The wheel axle 62 is provided with top and bottom openings 64, 66 through which the third cylinder 30 extends. As will be explained, the wheel axle 62 can perform a rotating motion with respect to the third cylinder 30, thereby turning the wheel 60. Although the wheel axle 62 is rotatable relative to the third cylinder 30, the longitudinal position is fixed. Thus, the wheel axle 62 is not allowed to move up or down the third cylinder 30. The lower side of the wheel axle is rigidly connected to a flange 68 protruding laterally from a location below the third cylinder 30. The other end of the flange 68 is connected to a slider 70 (see FIG. 2), which slides along and rotates with the rotatable shaft 50.

Figure 2:
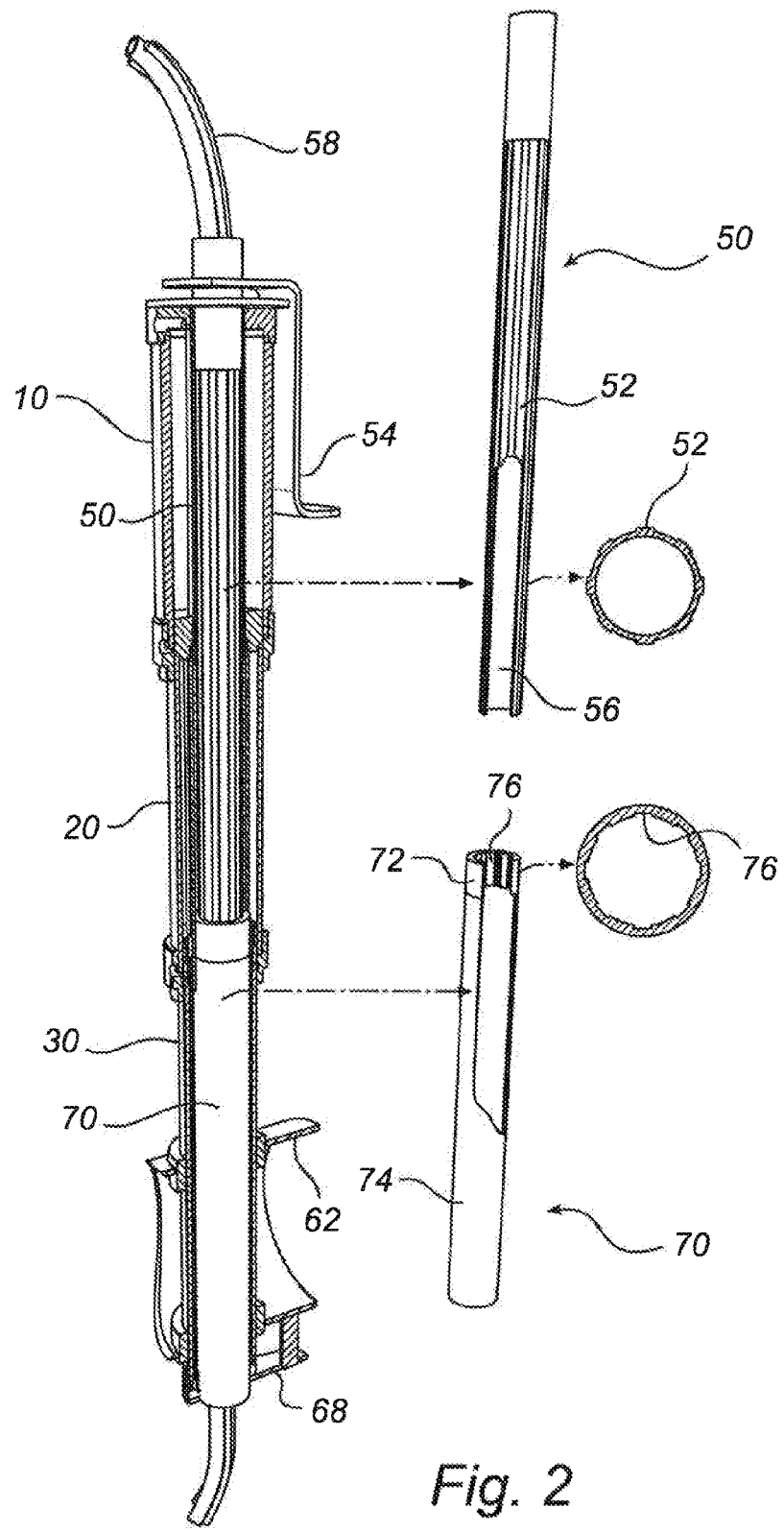
FIG. 2 illustrates an example of a transmission means inside the telescoping cylinder device of FIG. 1, in this instance, in the form of a rotating shaft on which a slider is displaceable.

As may be seen in FIG. 2, in this particular example embodiment, the shaft 50 is provided with circumferentially separated elongate beams 52. The slider 70 is tubular and surrounds the shaft 50. The slider 70 has a relatively short proximal portion 72 and a long distal portion 74. In this example embodiment, only the upper portion 72 is provided with radially extending recesses or indentations 76 which are adapted to mate with the beams 52 of the shaft 50. Another alternative would be to have elongate recesses extending along the entire slider 70. The tubular slider 70 is thus enabled to slide up and down the shaft 50. Furthermore, when the shaft 50 is rotated the slider 70 will also be rotated, and consequently the flange 68 and the connected axle 62 and wheel 60 will all be rotated relative to the third cylinder 30.

Because of the fixed longitudinal relationship between the wheel axle 62 and the third cylinder 30, an advancement of the third cylinder 30 will also result in an advancement of the slider 70. Thus, in its most advanced position the slider 70 will still have to be able to transmit the rotating motions of the shaft 50. This may, for instance, be accomplished by means of said elongate beams 52 on the shaft 50 to which the matching recesses 76 of the slider 70 engages.

As illustrated in both FIG. 1 and FIG. 2, the proximal end of the shaft 50 is, in at least this example embodiment, engaged with an s-shaped or angled arm 54, which in turn may be connected to a suitable steering arrangement, e.g. a tie rod arrangement or the like. Thus, when the angled arm 54 is rotated, the shaft 50 becomes rotated to turn the wheel 60.

It is not only the cylinders 10, 20, 30 that are hollow, also the shaft 50 may be hollow providing a through passage 56 (see FIG. 2) for other transmission means 58, e.g. cables, tubing and the like for transmitting hydraulic fluid, electrical signal or other communication to e.g. instruments or tools, etc.

In this example, each cylinder 10, 20, 30 is double-walled, i.e. provided with a cylindrical inner and a cylindrical outer wall. Thus, a space is formed between the inner and outer wall allowing the next cylinder to be displaced in said space. The cylinders are provided with a number of ports for supplying/removing hydraulic fluid into said spaces for expanding and/or condensing the telescoping cylinder device.

Figure 3A:
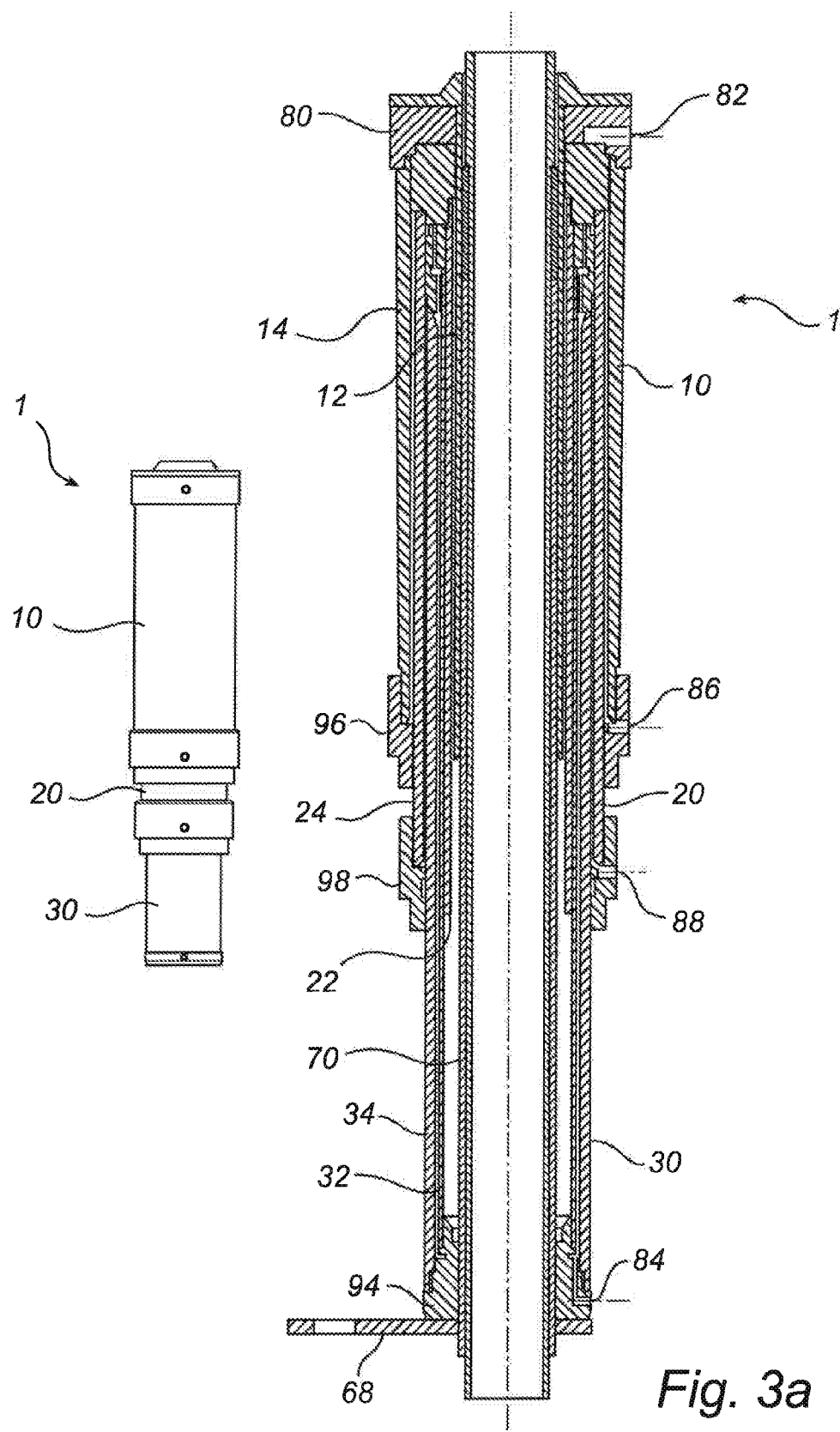
FIG. 3a illustrates a cross-section of the telescoping cylinder device of FIG. 1, and also a miniature side view thereof.

FIG. 3a illustrates in a cross-sectional view (and in a miniature schematic side view) the telescoping cylinder device 1 in a condensed state. The first cylinder 10 has a cylindrical inner wall 12 and a cylindrical outer wall 14. Likewise, the second cylinder 20 has a cylindrical inner wall 22 and a cylindrical outer wall 24, and also the third cylinder 30 has a cylindrical inner wall 32 and a cylindrical outer wall 34. The walls 32, 34 of the third cylinder 30 have been fully retracted (proximally) into the space 23 formed by the inner wall 22 and outer wall 24 of the second cylinder 20. Said space 23 is best visible in FIG. 3c. Turning back to FIG. 3a, the walls 22, 24 of the second cylinder 20 have been fully retracted into the space 13 formed by the inner wall 12 and outer wall 14 the first cylinder 10. Said space 13 is also visible in FIG. 3c.

In the example embodiment shown in FIGS. 3a-3e, an annular end piece 80 is provided and connected to both the inner wall 12 and the outer wall 14 of the first cylinder 10. The end piece 80 provides a proximal stop for the second cylinder 20. In at least one alternative embodiment, the end piece 80 may be replaced by bulged walls of the first cylinder 10. The proximal end of the inner wall of the first cylinder may have a bulge towards the outer wall. Similarly, the proximal end of the outer wall may have a bulge directed towards the inner wall. The two bulges may be welded, thus forming a proximal stop for the second cylinder 20. Of course, other alternatives are also conceivable, such as having a relatively large bulge on one of the inner and outer walls welded to a bulge-less end of the other wall.

FIG. 3a also illustrates four ports 82, 84, 86, 88 for passing pressure medium into and/or out from the telescoping cylinder device 1. In the shown example embodiment, there are a first and second pressure line ports 82, 84 connected to two pressure lines (not shown) and first and second return line ports 86, 88 for two return lines (not shown). The first pressure line port 82 is provided in said annular end piece 80. The second pressure line port 84 is provided in a first coupling element 94, the first return line port 86 is provided in a second coupling element 96, and the second return line port 88 is provided in a third coupling element 98. The first coupling element 94 is annular and connects the third cylinder 30 to the slider 70, suitably the coupling element 94 may have an external thread matching an internal thread of the third cylinder 30. The second coupling element 96 is annular and is fixedly connected to the first cylinder 10, for instance, by means of an internal thread matching an external thread of the first cylinder 10. The second coupling element 96 abuts the second cylinder 20 and is provided with appropriate seals and force absorbing guide means to allow the second cylinder 20 to be displaced in the first cylinder 10, without any leakage of pressure medium between their outer walls 14, 24. Similarly the third coupling element 98 is annular and is fixedly connected to the second cylinder 20, for instance, by means of an internal thread matching an external thread of the second cylinder 20. The third coupling element 98 abuts the third cylinder 30 and is provided with appropriate seals and force absorbing guide means to allow the third cylinder 30 to be displaced in the second cylinder 20, without any leakage of pressure medium between their outer walls 24, 34.

Figure 3B:
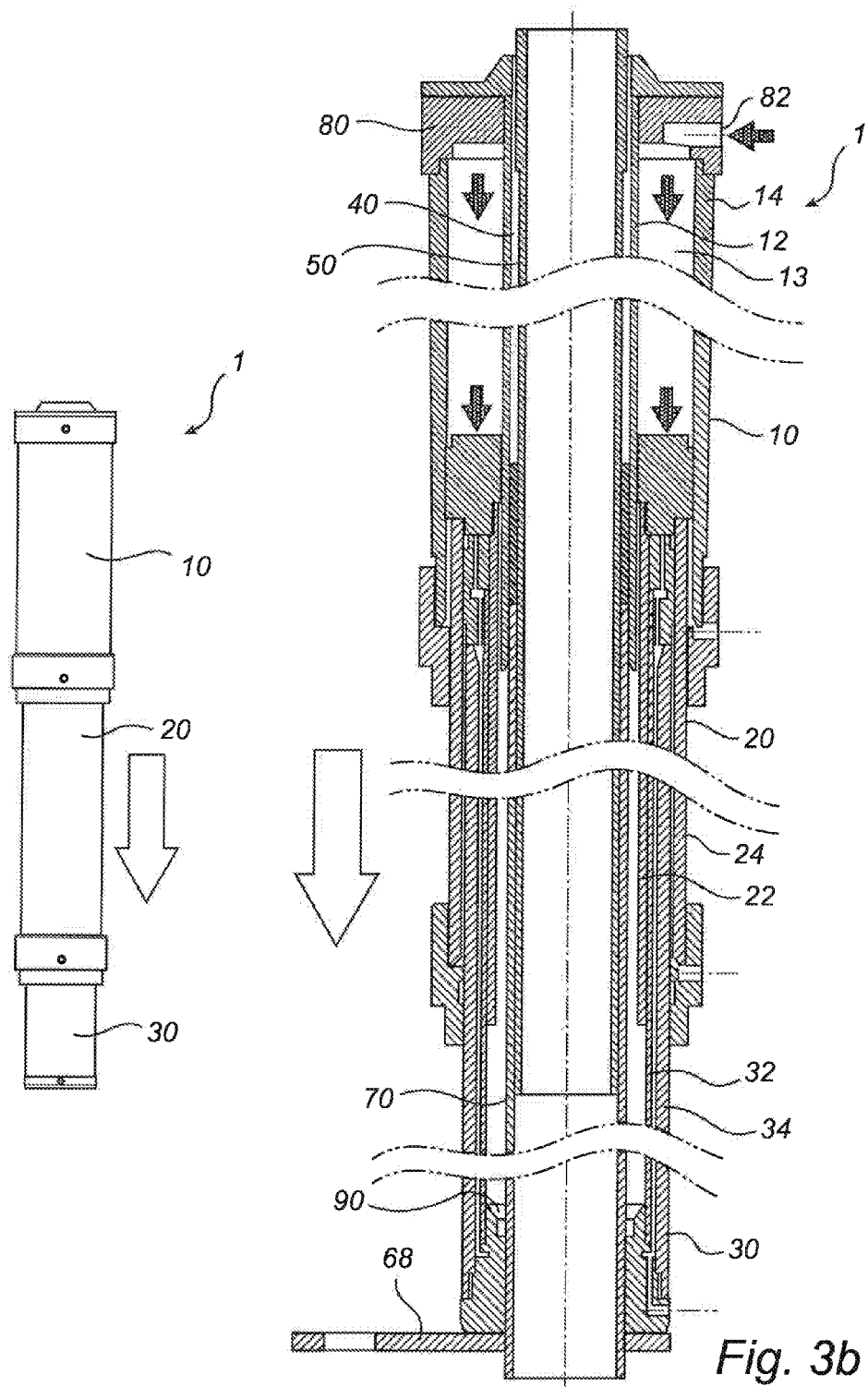
FIGS. 3b-3e illustrate an example of the operation of the cylinders in a telescoping cylinder device.

In FIG. 3b, as indicated by the dark arrows, a pressure medium is introduced through the first pressure line port 82 which leads to a proximal area of the space 13 between the inner and outer walls 12, 14 of the first cylinder 10. The pressure medium will cause the second cylinder 20 to be advanced in the distal direction (indicated by the bright arrows). Because the second cylinder 20 is displaced, the third cylinder 30 having its walls 32, 34 between the double-walls 22, 24 of the second cylinder 20, will also be displaced. Furthermore, because of the previously described fixed axial linking between the third cylinder 30 and the slider 70, the slider 70 will also be equally displaced. However, it should be noted that there is substantially no displacement of the third cylinder 30 relative to the second cylinder 20. The third cylinder 30 is still in a retracted position in the second cylinder 20.

Figure 3C:
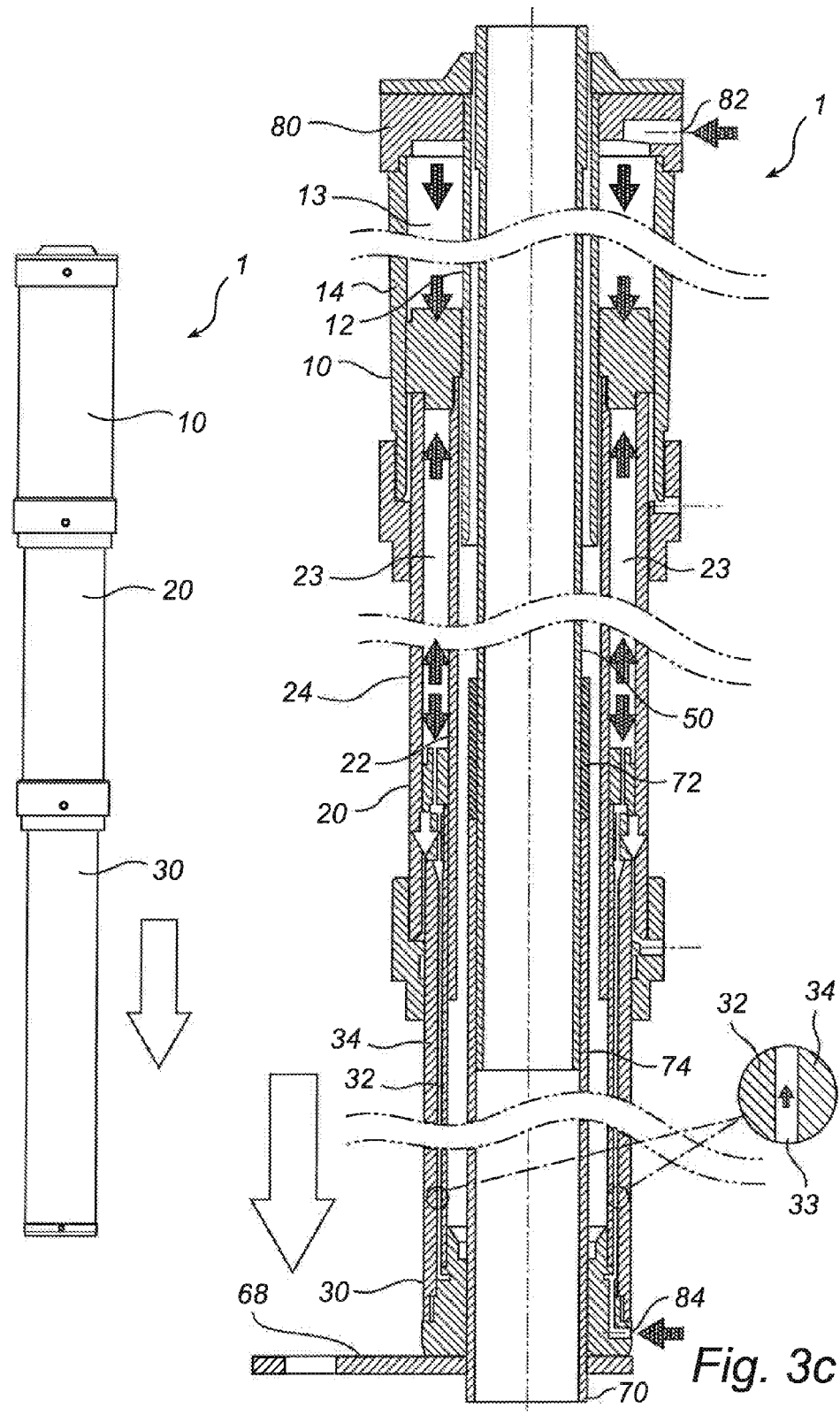

In FIG. 3c, in addition to introducing the pressure medium through the first pressure line port 82, a pressure medium is also introduced through the second pressure line port 84. The second pressure line port 84 leads to a conduit including the space 33 between the inner 32 and outer walls 34 of the third cylinder 30. The conduit leads to the proximal end of the third cylinder 30 and into the space 23 defined by the inner and outer walls 22, 24 of the second cylinder 20. As that space 23 is filled with pressure medium, and with appropriate counter-pressure in the cylindrical space 13 of the first cylinder 10, the third cylinder 30 will be advanced in the distal direction to an expanded state of the telescoping cylinder device 1. The slider 70 will maintain its axial position relative to the third cylinder 30 and will consequently travel along the shaft 50 the same distance as the third cylinder 30.

It should be noted that, the second pressure line port 84 may be used without using the first pressure line port 82, if only the third cylinder 30 should be advanced, i.e. without advancing the second cylinder 20.

Figure 3D:
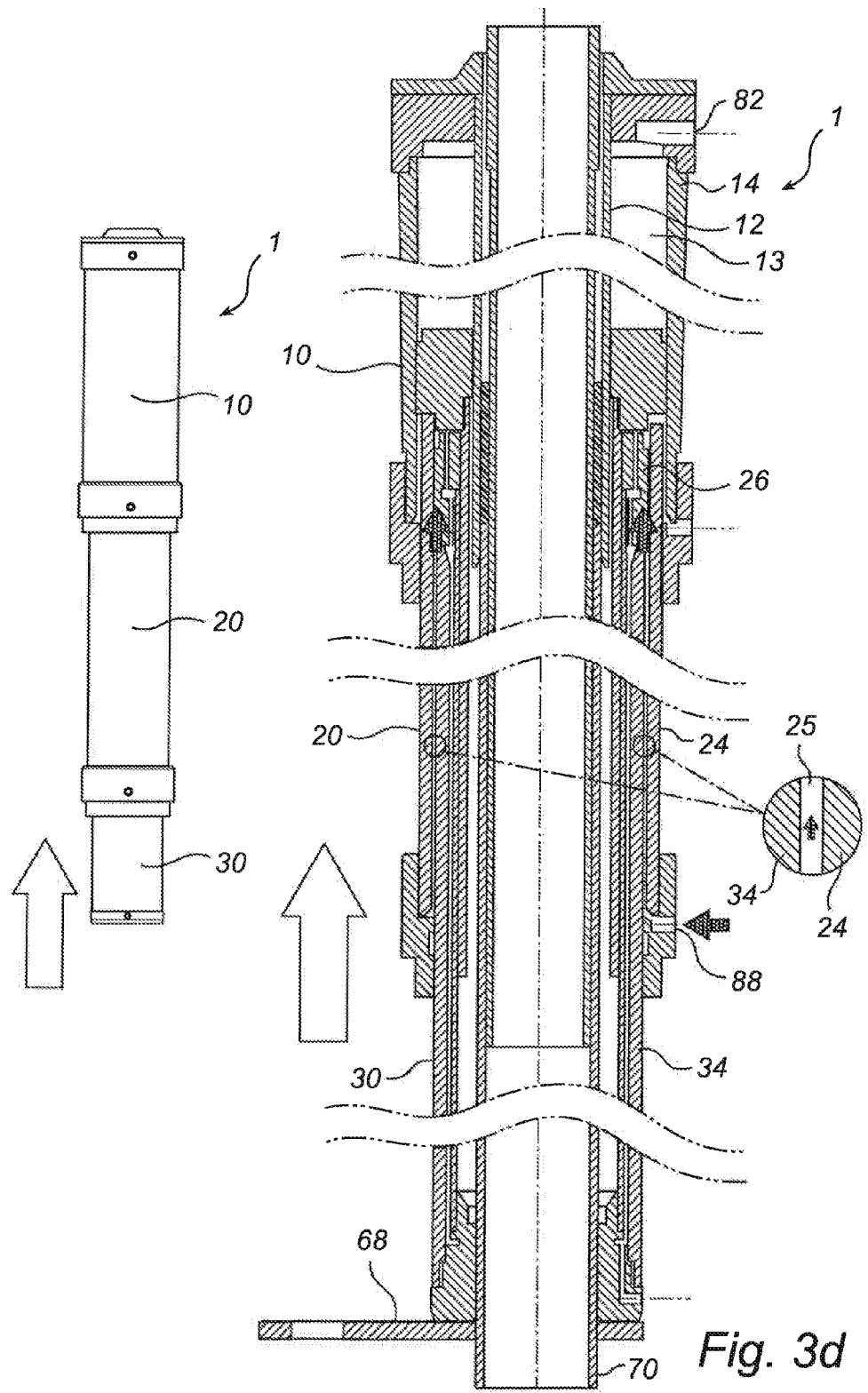

In FIG. 3d, pressure medium is introduced through the second return line port 88 leading to a clearance 25 between the outer wall 24 of the second cylinder 20 and the outer wall 34 of the third cylinder 30. The clearance 25 is sealed proximally by a plunger with associated plunger seal, herein commonly referred to as seal 26, wherein the seal 26 will be subjected to the pressure of the pressure medium, causing the third cylinder 30 to move in the proximal direction, i.e. be retracted back into the second cylinder 20. Again, the slider 70 follows the motion of the third cylinder 30. A counter-pressure may be provided by a pressure medium in the cylindrical space 13 defined by the double-walls 12, 14 of the first cylinder 10, to maintain the second cylinder 20 in a substantially constant position relative to the first cylinder 10.

Figure 3E:
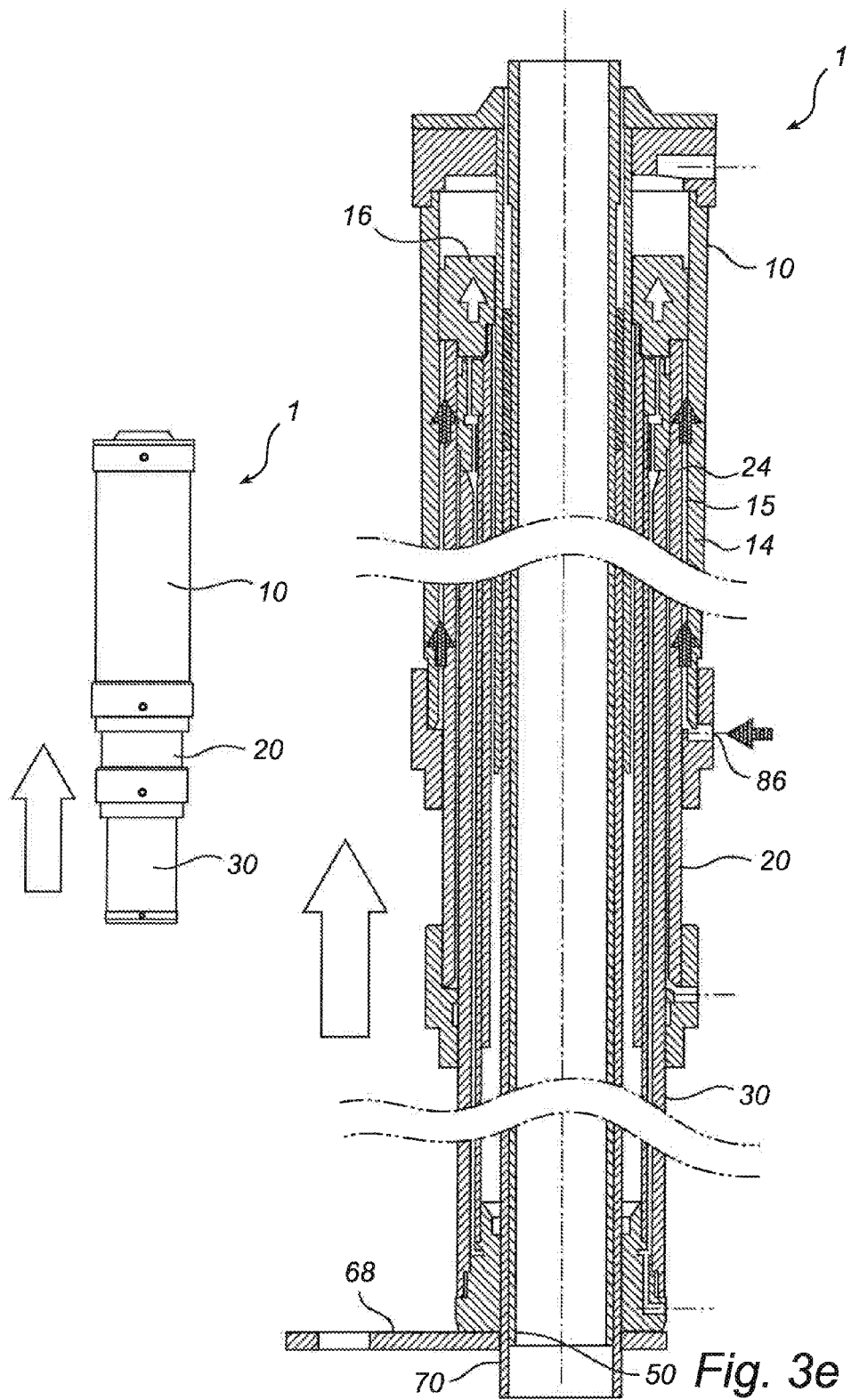

In FIG. 3e, pressure medium is introduced through the first return line port 86 leading to a clearance 15 between the outer wall 14 of the first cylinder 10 and the outer wall 24 of the second cylinder 20. The proximal end of the clearance 15 is sealed by a plunger with associated plunger seal, herein commonly referred to as seal 16, wherein the seal 16 will be subjected to the pressure of the pressure medium, causing the second cylinder 20 to be retracted back into the first cylinder 10. Thus, the telescoping cylinder device 1 is eventually brought back into its condensed state.

It should be noted that pressure medium may be introduced in a different order than described above, depending on which cylinder is to be moved and in which direction. Furthermore, pressure medium may be simultaneously introduced through the first and second pressure line ports 82, 84, advancing the second and third cylinders simultaneously, either with the same speed or each with a different speed. The corresponding principle applies for the return line ports 86, 88. Moreover, the pressure medium may be introduced simultaneously through the first pressure line port 82 (to advance the second cylinder 20) and through the second return line port 88 (to retract the third cylinder 30). Similarly, the second pressure line port 84 and the first return line port 86 may be operated simultaneously.

One of the cylinders may form part of a shock-absorption arrangement, in which case it may be provided in a partially (intermediate) advanced position, while another cylinder may be used for changing the distance between the vehicle wheel and the chassis (or, instead of a vehicle wheel, the axial movement of any other object as discussed previously).

For a normal passenger car, not requiring an axial extension, it may be enough with two cylinders rather than three cylinders in the telescoping cylinder device. The cylinders may form part of a shock-absorption arrangement, wherein depending on e.g. road conditions a computer may regulate how much pressure medium should be present in the telescoping cylinder device.

Figure 4:
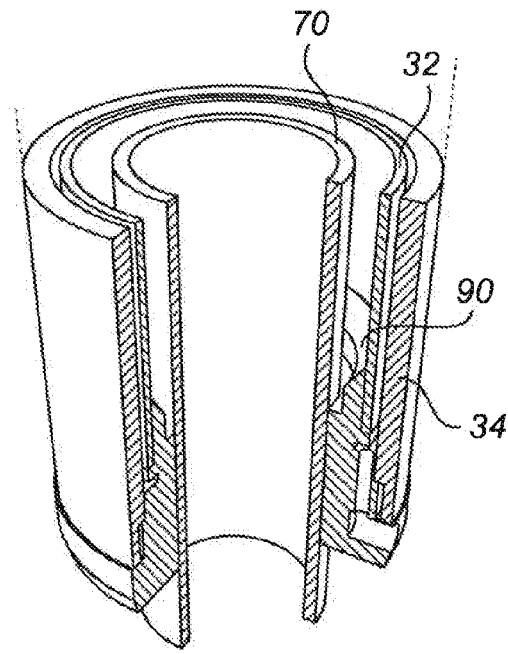
FIG. 4 illustrates a detail at a distal portion of the telescoping cylinder device of FIG. 1.

FIG. 4 is perspective view, partly in cross-section of a leakage collector 90, herein illustrated as a circular tray (although other configurations are also possible). The leakage collector 90 is provided between the inner wall 32 of the third cylinder 30 and the slider 70 (see also e.g. FIG. 3b). The leakage collector 90 is adapted to receive leakage from an area located between the inner wall of one of the cylinders and a facing inner wall of another one of the cylinders. Any leakage may be recirculated to a reservoir (not shown). As may be seen in e.g. FIG. 3b, the leakage collector is located at a distal portion of the telescoping cylinder device 1.

Figure 5:
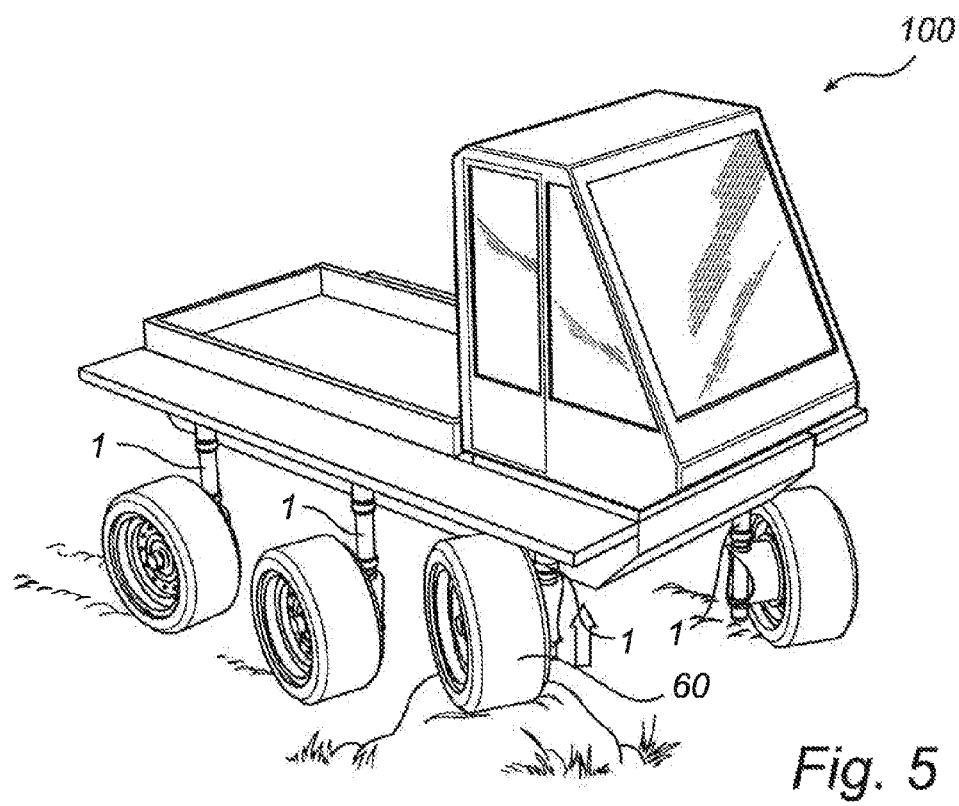
FIG. 5 illustrates telescoping cylinder devices mounted on a vehicle.

FIG. 5 illustrates a vehicle 100 having six telescoping cylinder devices 1, for instance, of the type illustrated in the previous drawings. Each telescoping cylinder device 1 may be operated individually, or in pairs. In the illustrated example, one front wheel 60 has been raised by condensing (retracting the cylinders) its telescoping cylinder device in order to pass an obstacle. It would also be possible to raise both front wheels, e.g. to pass a fence, and when the front wheels have been lowered onto the ground on the other side of the fence, the intermediate wheels are raised in order for them to pass the fence, and finally the same operation is done with the rear wheels. Also, in order to compensate for a lateral slope, the three telescoping devices on one side may be more expanded than the three telescoping devices on the other side of the vehicle.

Figure 6A:
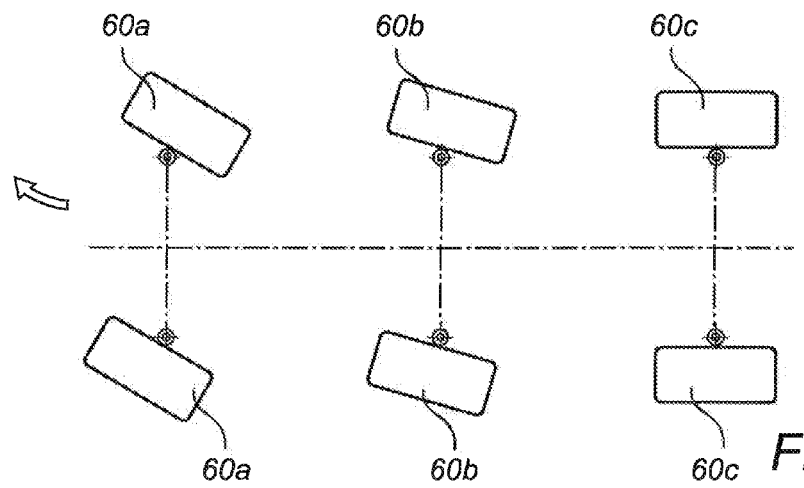
FIGS. 6a-6c illustrates three different modes of operation of a vehicle, such as the vehicle illustrated in FIG. 5.
Figure 6B:
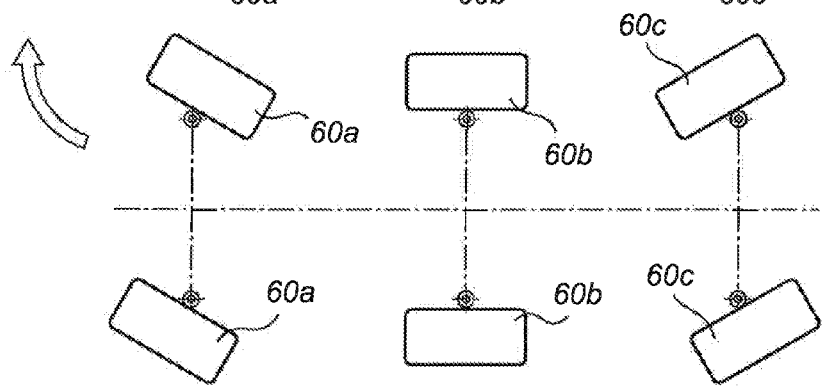
Figure 6C:
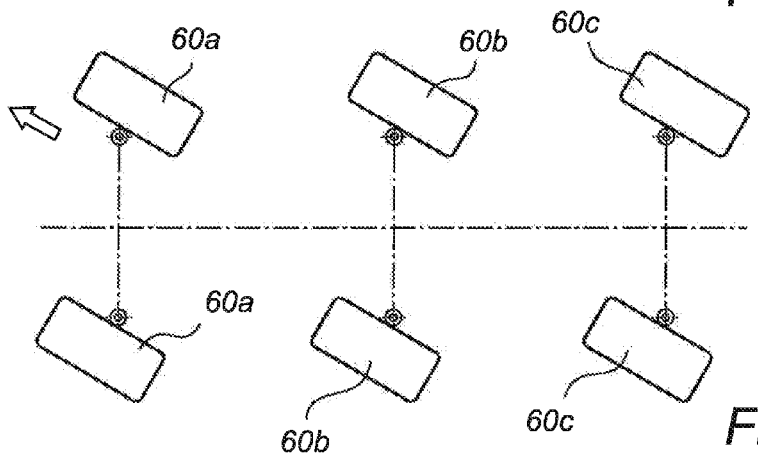

FIGS. 6*a*-6*c* illustrates three different modes of operation of a vehicle, such as the vehicle illustrated in FIG. 5. A driver may select via a control unit which of the three modes of operation to use at present. For explanatory purposes, only the wheels of the vehicles are illustrated, wherein the figures show a pair of front wheels 60*a*, a pair of intermediate wheels 60*b* and a pair of rear wheels 60*c*.

FIG. 6*a* illustrates an example of wheel alignment when turning the vehicle during "normal" driving conditions. Thus, the transmission means (e.g. rotating shafts) inside the telescoping cylinder devices connected to the front wheels 60*a* have caused the front wheels 60*a* to rotate at a first angle relative to the longitudinal extension (longitudinal axis) of the vehicle. The intermediate wheels 60*b* are at a slightly smaller angle, while the rear wheels 60*c* are parallel with the longitudinal extension of the vehicle. As illustrated by the arrow, this wheel alignment will enable the vehicle to perform a smooth turn.

The wheel alignment of FIG. 6*b* enables the vehicle to turn about the intermediate wheels 60*b*, which are parallel with the longitudinal extension of the vehicle. The angle of the front wheels 60*a* is the same as in FIG. 6*a*. The rear wheels 60*c* have, however, been rotated in the opposite direction at approximately the corresponding angle.

In FIG. 6*c*, the angle of the front wheels 60*a* is the same as in the previous figures. Additionally, the intermediate wheels 60*b* and the rear wheels 60*c* have also been rotated to that angle. This allows a diagonal movement of the vehicle, which may be advantageous when there is limited space available (e.g. when parking the vehicle between other vehicles).

It should be noted, that although the figures have shown a cylindrical telescoping device carrying a vehicle wheel, it should be understood that it may be used for carrying any other suitable object, such as tools, equipment, instruments, etc. Similarly, it may be held by another structure than a vehicle chassis.

Likewise, although the rotatable shaft and the slider has been illustrated in the example drawings, it should be understood that the through hole in the telescoping cylinder device may be used for other transmission means as well, such as signal or fluid transmission, etc.

The invention claimed is:

1. A telescoping cylinder device, comprising
   a first cylinder having a cylindrical inner wall, a cylindrical outer wall and a space between said inner and outer walls;
   a second cylinder having a cylindrical wall which is axially displaceable in said space in response to a pressure exerted by a pressure medium; and
   a central through hole extending axially through said first and second cylinders and providing a passage for a transmission device,
   wherein the transmission device comprises a rotatable shaft extending axially in said through holes for transmitting a rotating motion to an object operatively connected to the rotatable shaft.

2. The telescoping cylinder device as claimed in claim 1, wherein the cylindrical wall of said second cylinder comprises a cylindrical inner wall, a cylindrical outer wall and a space between said inner and outer walls, the device further comprising
   a third cylinder having a cylindrical wall which, in response to a pressure medium, is axially displaceable in said space between the inner and outer walls of said second cylinder, wherein a central through hole extends axially through the third cylinder.

3. The telescoping cylinder device as claimed in claim 2, wherein the second and third cylinders are
   individually advanceable by means of pressure medium provided in separate pressure lines connected to the respective cylinders, and/or
   individually retractable by means of pressure medium provided in separate return lines connected to the respective cylinders.

4. The telescoping cylinder device as claimed in claim 1, wherein the rotatable shaft is provided with circumferentially spaced elongate beams.

5. The telescoping cylinder device as claimed in claim 1, wherein said shaft is hollow and provides a passage for at least one additional transmission device.

6. The telescoping cylinder device as claimed in claim 1, comprising a slider which is adapted to slide axially on the shaft, wherein the slider is operatively connected to said object to transmit the rotating motion of the shaft to said object.

7. A vehicle, comprising
   a chassis,
   a plurality of telescoping cylinder devices, wherein
   each telescoping cylinder device is operatively connected to a respective wheel, wherein a vertical distance between each wheel and the chassis is dependent on a length of expansion of the respective telescoping cylinder device, and wherein
   each telescoping cylinder device has an axial through hole forming a passage for an axially extending rotatable shaft, wherein the shaft is operatively connected to the wheel for transmitting a rotating motion to the wheel, wherein said telescoping cylinder devices are the telescoping device of claim 1.

8. A vehicle, comprising
   a chassis,
   a plurality of telescoping cylinder devices, wherein
   each telescoping cylinder device is operatively connected to a respective wheel, wherein a vertical distance between each wheel and the chassis is dependent on a length of expansion of the respective telescoping cylinder device, and wherein
   each telescoping cylinder device has an axial through hole forming a passage for an axially extending rotatable shaft, wherein the shaft is operatively connected to the wheel for transmitting a rotating motion to the wheel.

9. The vehicle as claimed in claim 8, comprising a controller which is adapted to individually expand or condense the plurality of telescoping cylinder devices, and which is adapted to individually rotate the respective shaft.

10. The vehicle as claimed in claim 8, wherein the vehicle has a pair of front shafts connected to front wheels, a pair of rear shafts connected to rear wheels, and optionally one or more pairs of intermediate shafts connected to intermediate wheels, wherein the vehicle comprises a controller adapted to rotate said shafts in pairs.

* * * * *